US007197118B2

(12) United States Patent
Anno et al.

(10) Patent No.: US 7,197,118 B2
(45) Date of Patent: Mar. 27, 2007

(54) X-RAY APPARATUS

(75) Inventors: Hidero Anno, Otawara (JP); Koichi Kitade, Otawara (JP); Takayuki Kitami, Nasu-gun (JP); Hironori Nakamuta, Otawara (JP); Manabu Sato, Nasu-gun (JP)

(73) Assignees: Kabushiki Kaisha Toshiba, Tokyo (JP); Toshiba Electron Tubes & Devices, Tokyo (JP)

( * ) Notice: Subject to any disclaimer, the term of this patent is extended or adjusted under 35 U.S.C. 154(b) by 0 days.

(21) Appl. No.: 11/404,778

(22) Filed: Apr. 17, 2006

(65) Prior Publication Data

US 2006/0193439 A1    Aug. 31, 2006

Related U.S. Application Data

(63) Continuation of application No. PCT/JP04/15386, filed on Oct. 18, 2004.

(30) Foreign Application Priority Data

Oct. 17, 2003    (JP)    ............................. 2003-358275

(51) Int. Cl.
    *H01J 35/00*    (2006.01)
(52) U.S. Cl. .................... 378/130; 378/132; 378/200
(58) Field of Classification Search ................ 378/119, 378/121–144, 199, 200
    See application file for complete search history.

(56) References Cited

U.S. PATENT DOCUMENTS 6,115,454 A * 9/2000 Andrews et al. ............ 378/140

6,286,998 B1 * 9/2001 Dilick ........................ 378/200
6,314,161 B1 * 11/2001 Anno ......................... 378/125
6,453,010 B1 * 9/2002 Miller et al. ................ 378/130

FOREIGN PATENT DOCUMENTS

| JP | 09-171789 | 6/1997 |
| JP | 2001-502473 | 2/2001 |
| JP | 2002-536804 | 10/2002 |
| JP | 2003-197136 | 7/2003 |
| WO | WO 02/082495 A1 | 10/2002 |

OTHER PUBLICATIONS

International Search Report dated Feb. 15, 2005 for Appln. No. PCT/JP2004/015386.

* cited by examiner

*Primary Examiner*—Edward J. Glick
*Assistant Examiner*—Jurie Yun
(74) *Attorney, Agent, or Firm*—Pillsbury Winthrop Shaw Pittman, LLP

(57) ABSTRACT

The present invention is characterized by supporting a stator to generate a magnetic field and an anode target by a dynamic pressure plain bearing using a liquid metal, and cooling at least the inside of the dynamic pressure plain bearing and an enclosure containing an anode target by circulating one kind of cooling medium, in a rotary X-ray tube apparatus which obtains X-rays by impinging an electron on an anode by rotating an anode target.

11 Claims, 10 Drawing Sheets

X-RAY APPARATUS

CROSS REFERENCE TO RELATED APPLICATIONS

This is a Continuation Application of PCT Application No. PCT/JP2004/015386, filed Oct. 18, 2004, which was published under PCT Article 21(2) in Japanese.

This application is based upon and claims the benefit of priority from prior Japanese Patent Application No. 2003-358275, filed Oct. 17, 2003, the entire contents of which are incorporated herein by reference.

BACKGROUND OF THE INVENTION

1. Field of the Invention

The present invention relates to an X-ray apparatus, and a rotating anode X-ray tube applied to an X-ray apparatus.

2. Description of the Related Art

An X-ray apparatus using a rotary anode X-ray tube is composed of a rotary anode X-ray tube main body which contains a rotatably supported anode target in a vacuum enclosure, a stator coil which supplies a driving magnetic field from the outside of the X-ray tube main body to a rotor connected to the anode target, and a housing which contains the X-ray tube main body and stator coil.

The space between the housing and rotary anode X-ray tube main body is filled with a cooling medium to radiate the heat generated from the anode target, for example, insulating oil and non-oil/fat cooling liquid including water as a main component. Namely, the heat from the anode target is radiated to the cooling medium, and the cooling medium is cooled by convection, and the heat is exhausted. As a result, a heating element such as an anode target is cooled. An example of using an external heat exchanger for forced cooling, as well as circulating an insulating oil and a non-oil/fat cooling liquid, in order to ensure heat exhaustion, or a cooling efficiency (for example, PCT National Publication No. 2001-502473).

A large rotating anode X-ray tube apparatus having a large X-ray output uses a dynamic pressure plain bearing, in which a spiral groove is formed on the bearing surface of a rotary support mechanism to support an anode target rotatably, and the spiral groove is filled with liquid metal lubricant, such as gallium (Ga) and gallium-indium-tin (Ga—In—Sn) alloy.

To radiate the heat generated by an anode target in a rotating anode X-ray tube using a dynamic pressure plain bearing, there has been proposed a method of transmitting the generated heat from the anode target to a rotary body and further transmitting the heat to a fixed body through the bearing surface of the dynamic pressure plain bearing (for example, Jpn. Pat. Appln. KOKAI Publication No. 9-171789).

However, when a dynamic pressure plain bearing is used, a stator easily generates heat, and a temperature of the bearing may be rapidly increased in a short time.

When the temperature of the bearing is increased, the bearing metal surface and liquid metal lubricant react with each other, and a layer of intermetallic compound is generated. This layer increases in a short time, and may finally stop rotation.

Therefore, in a rotating anode X-ray tube apparatus using a liquid metal lubricant dynamic bearing, it is necessary to keep a sufficient cooling efficiency to prevent deterioration of life by the heating.

BRIEF SUMMARY OF THE INVENTION

It is an object of the present invention to improve a heat radiation characteristic and to output X-rays stably for a long period in an X-ray apparatus, which uses a non-oil/fat cooling liquid to cool a rotating anode X-ray tube.

The present invention there is provided an X-ray apparatus comprising: n anode target which generates X-rays; an electron radiation source which generates an electron to the anode target; a rotor which is connected to the anode target; a stator which generates a driving force to rotate the rotor; a bearing which rotatably supports the rotor; an enclosure which keeps at least the anode target, electron radiation source and rotor at a predetermined vacuum; a housing which is configured to contain a cooling medium around the enclosure; a pump which circulates a cooling medium in the vicinity of the anode target and electron radiation source, and inside of the bearing; and a heat exchanger which radiates the heat transmitted by a cooling medium circulated by the pump.

Also, the present invention there is provided an X-ray apparatus comprising: a rotatable anode X-ray tube which contains a rotatable anode target and a cathode opposite to the anode target, in a vacuum enclosure; a stator which generates an induction electromagnetic field to rotate the anode target; a dynamic pressure plain bearing which rotatably supports the anode target, and uses a liquid metal as a lubricant; a housing which contains and holds at least the rotating anode X-ray tube; a flow path which is provided close to at least a part of the rotating anode X-ray tube, and circulates a water-based cooling medium; a gear pump which is provided at a predetermined position in the flow path, and circulates the water-based cooling medium; and cooling unit which has a radiator to radiate the heat of the water-based cooling medium.

Further, the present invention there is provided an X-ray apparatus comprising: a rotatable anode X-ray tube which contains a rotatable anode target and a cathode opposite to the anode target, in a vacuum enclosure; a stator which generates an induction electromagnetic field to rotate the anode target; a dynamic pressure plain bearing which rotatably supports the anode target, and uses a liquid metal as a lubricant; a housing which contains and holds at least the rotating anode X-ray tube; a flow path which is provided close to at least a part of the rotating anode X-ray tube, and configured to circulate a cooling medium in a space between the enclosure and housing; a gear pump which is provided at a predetermined position in the flow path, and circulates the cooling medium; and a cooling unit which has a radiator to radiate the heat of the cooling medium.

DETAILED DESCRIPTION OF THE INVENTION

Hereinafter, an embodiment of the present invention will be explained in detail with reference to the accompanying drawings.

Figure 1:
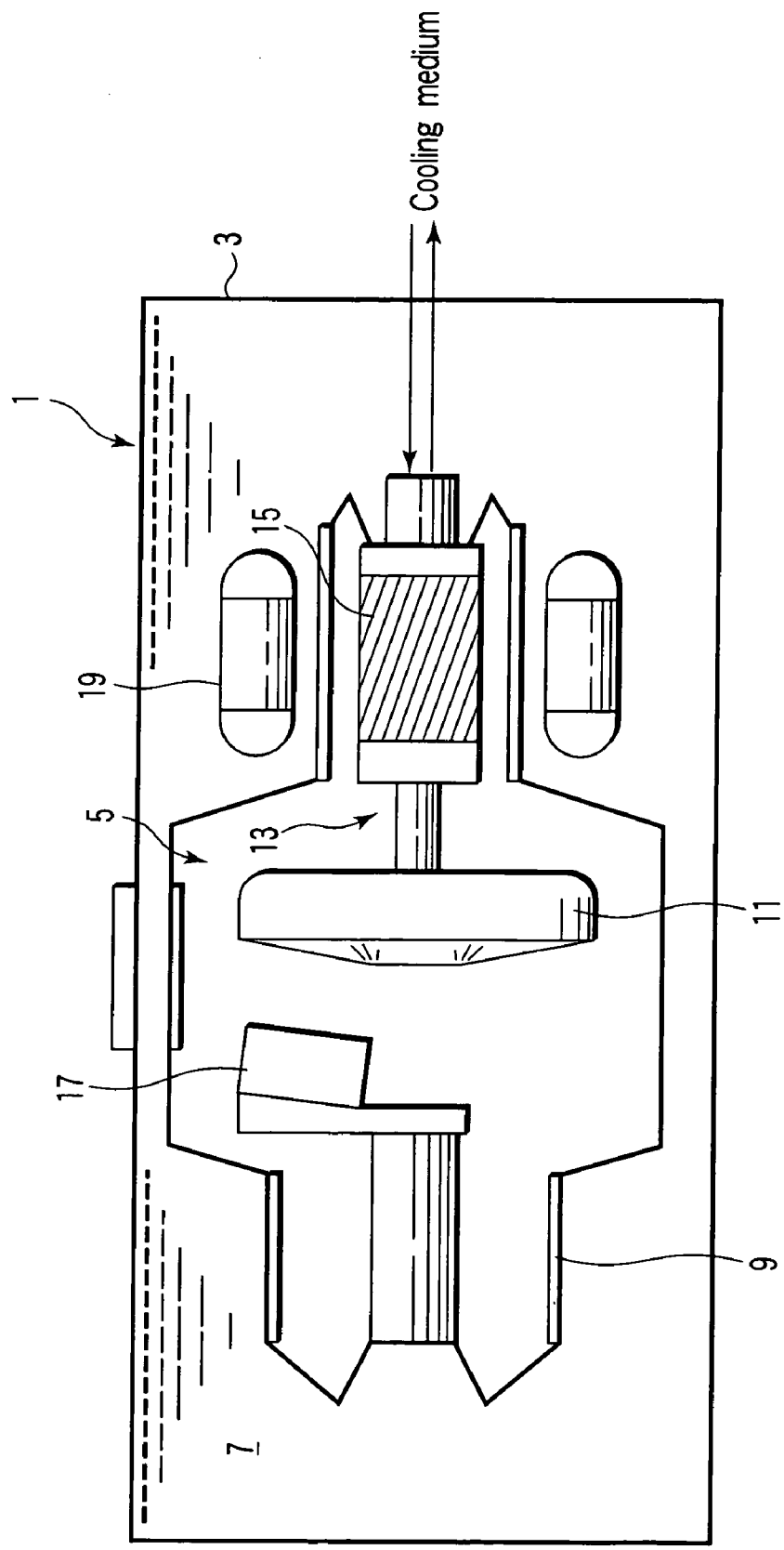
FIG. 1 is a schematic diagram explaining an example of an X-ray apparatus, to which an embodiment of the present invention is applicable.

As shown in FIG. 1, an X-ray apparatus 1, which is incorporated in an X-ray image diagnostic apparatus or a non-destructive inspection apparatus, for example, and radiates X-rays to be applied to an object or an inspection object, has a housing 3, and an X-ray tube main body 5 capable of radiating X-rays with predetermined intensity to a predetermined direction.

The X-ray tube main body 5 is housed at a predetermined position in the housing 3 through a non-oil/fat cooling liquid or well-know insulating oil, that is, a cooling medium 7, which includes water as a main component and has an electrical conductivity controlled to be lower than a predetermined value.

The X-ray tube main body 5 has an enclosure (vacuum vessel) 9, an anode target (anode) 11 which is provided in the enclosure 9 and radiates X-rays when an electron impinges, a rotary unit 13 which is formed integrally with the anode target 11 and rotated simultaneously with the anode target, a rotor 15 which is formed integrally with the rotary unit 13 and receives power (driving force) to rotate the rotary unit 13, and a cathode (electron gun) 17 which emits an electron to the anode target 17. At a predetermined position outside the cylindrical rotor 15 in the X-ray tube main body 5, a stator (stator coil) 19 which supplies a driving force (magnetic field) to rotor 15 is provided. The X-ray tube main body shown in FIG. 1 is of the type that the anode target is provided at one end of the rotary unit 13.

Figure 2:
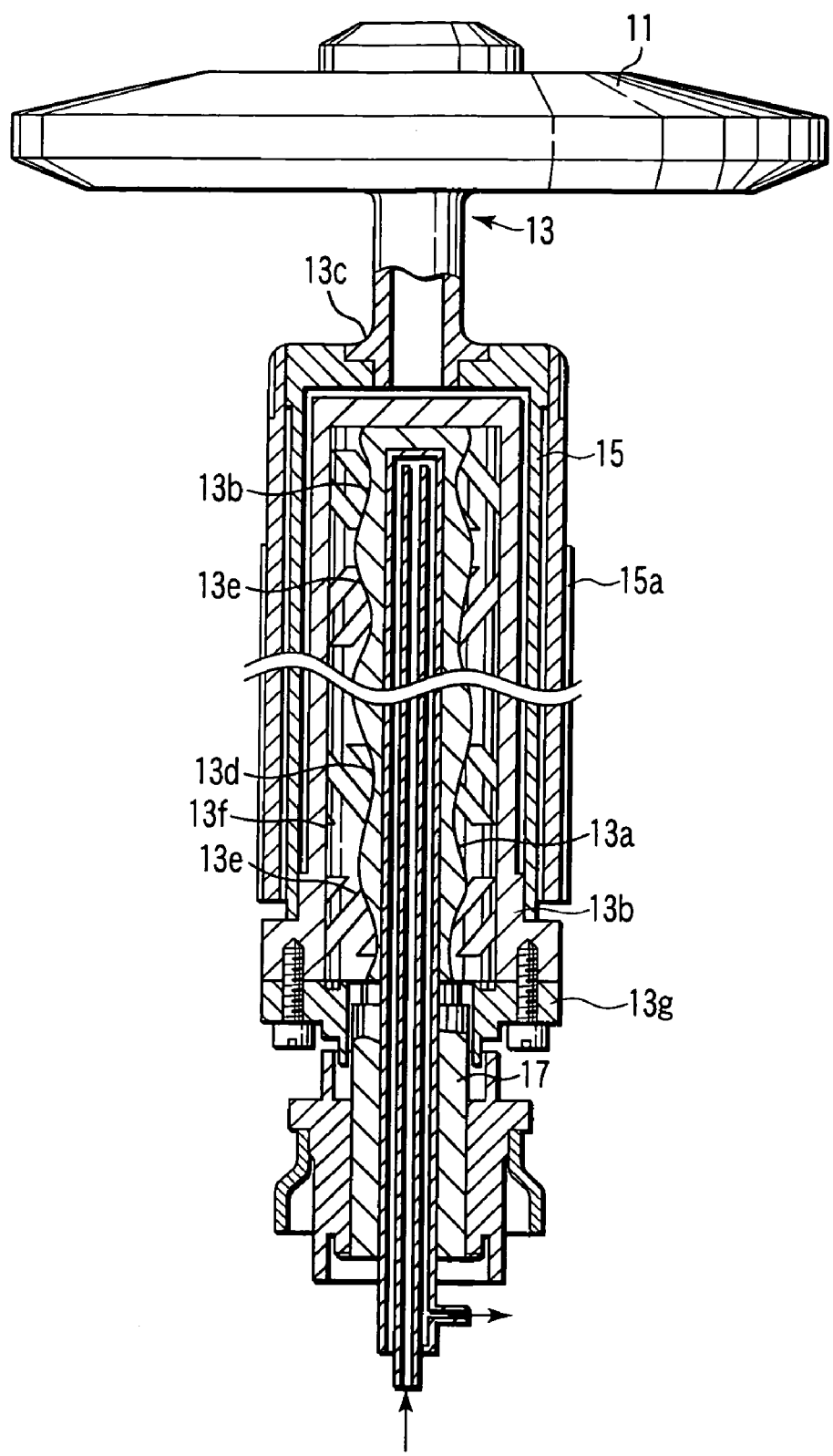
FIG. 2 is a schematic diagram showing an example of a rotating anode of an X-ray tube incorporated in the X-ray apparatus shown in FIG. 1.

FIG. 2 magnifies the part in the vicinity of the anode target of the X-ray tube main body of the X-ray tube apparatus shown in FIG. 1.

The anode target 11 is fixed to a connection part (neck) 13c provided at one end of the rotary body 13b of the rotary unit 13 of an outer ring rotation type, that is, the rotary body 13b rotates about a fixed shaft 13a inserted inside. The state that the rotary body 13b and connection part 13c are formed as one body, is called a support shaft. As explained before, a rotor structure 15a made of copper or copper alloy is fixed to the support shaft to serve as a rotor (15) which generates a driving force (rotating force) to rotate the anode target 11.

In the fixed shaft 13a, first and second spiral grooves 13d and 13e given specific directions along the axial direction are formed. At a predetermined position of the fixed shaft 13a, there is provided a support shaft or a lubricant holder 13f that is supplied with a lubricant (dynamic pressure bearing fluid) composed of Ga—In—Sn alloy, for example, that becomes liquid when the rotary body 13 is rotated.

Figure 3:
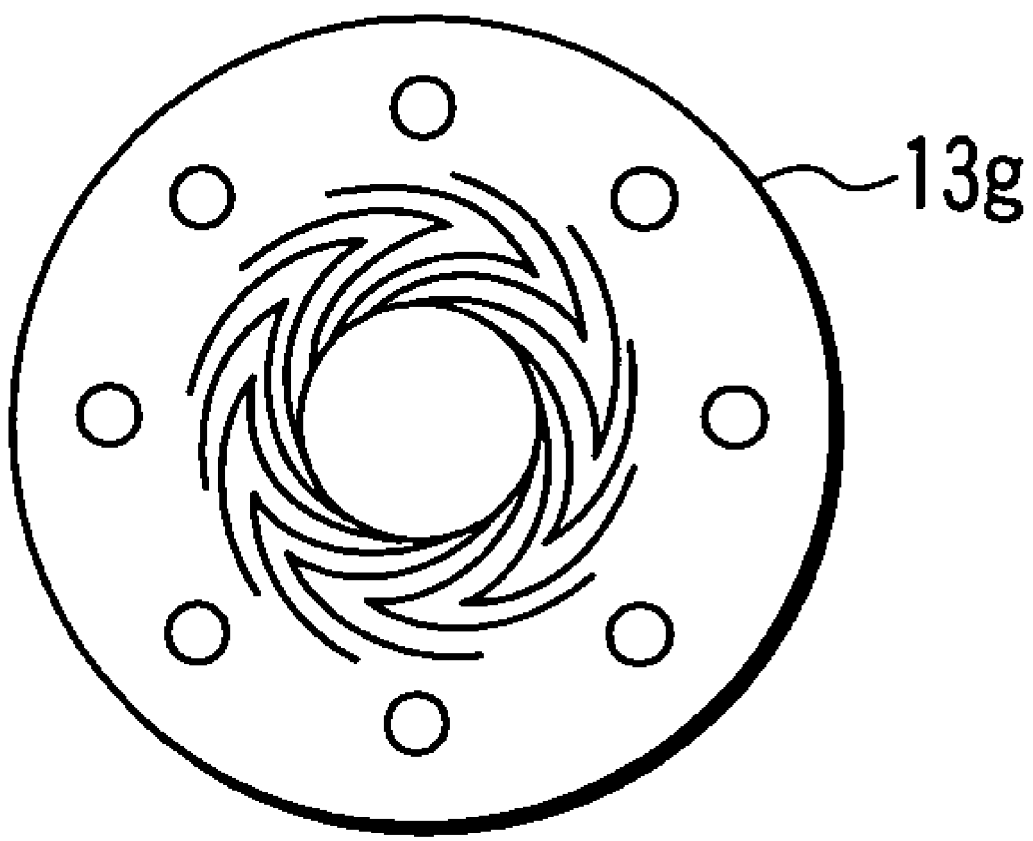
FIG. 3 is a schematic diagram explaining an example of a structure material to provide a bearing structure used in the rotating anode shown in FIG. 2.

At a predetermined position (the open end the rotary body 13b) opposite to the connection part 13c in the axial direction of the rotary body 13b, a thrust ring 13g having a third spiral groove as shown in FIG. 3 is fixed with a not-shown screw (8 screws in this example).

Namely the Ga—In—Sn alloy lubricant is sealed by the rotary body 13b and thrust ring 13g.

Figure 4:
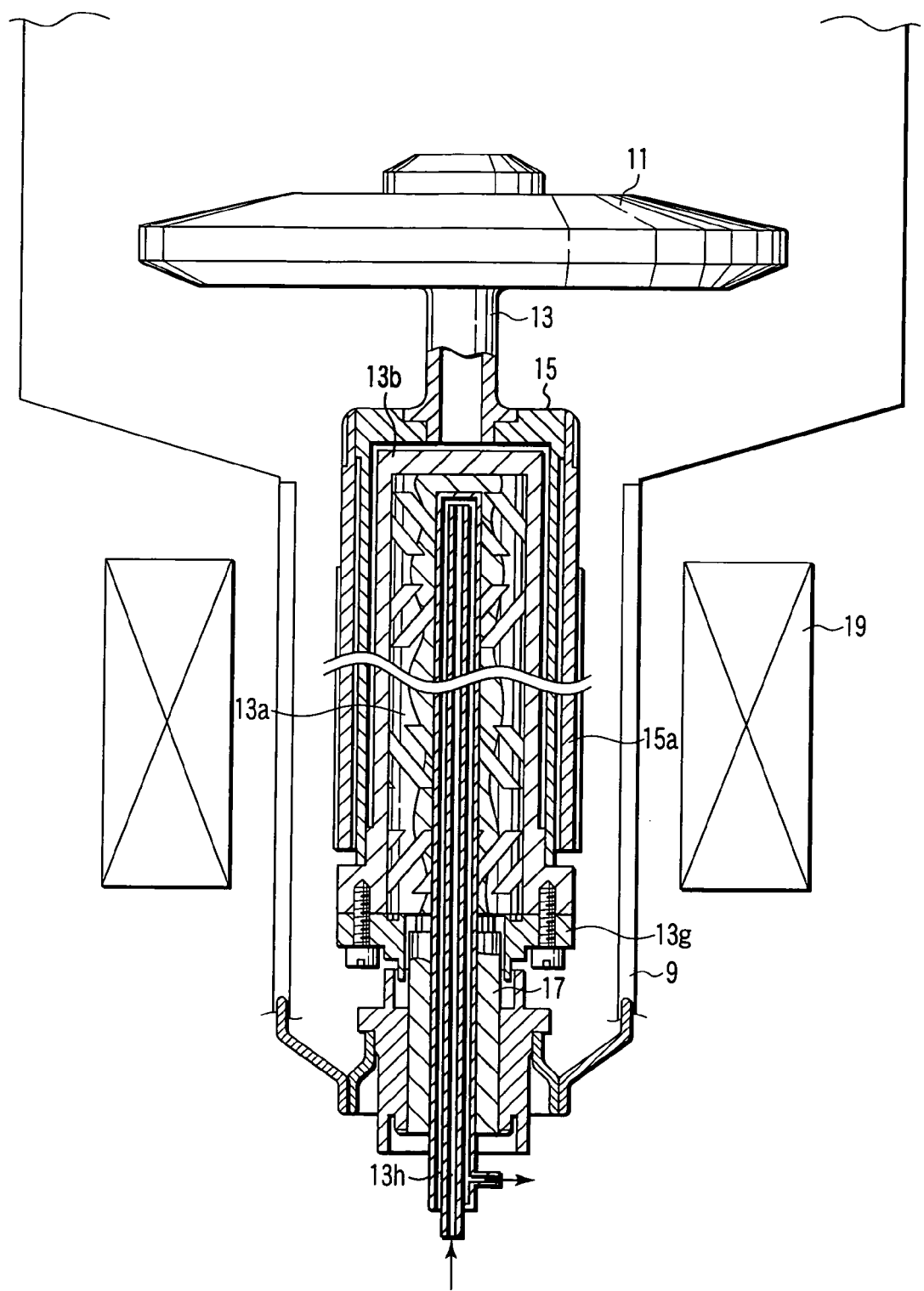
FIG. 4 is a schematic diagram explaining an example of configuration, in which the anode target and rotary unit shown in FIG. 2 and FIG. 3 are provided in the enclosure (vacuum vessel) shown in FIG. 1, and a cooling medium can be circulated in the enclosure.

FIG. 4 shows an example of a configuration, in which the anode target and rotary unit shown in FIG. 2 and FIG. 3 are provided in the enclosure (vacuum vessel) 9 shown in FIG. 1, and a cooling medium supplied from the thrust ring 13g into the housing 3 can be circulated.

In the example shown in FIG. 4, by making the fixed shaft 13a cylindrical and providing a pipe 13h at the center of the cylinder, the cooling medium 7 is supplied from one end side of the fixed shaft 13a into the fixed shaft 13a, circulated in the fixed shaft 13a, and exhausted into the housing 3, that is, the outside of the enclosure 9. When the cooling medium has insulation, the cooling medium 7 supplied to the fixed shaft 13a may be circulated in the enclosure as it is.

Specifically, the pipe 13h is guided into a hollow (fixed shaft 13a) from one end as indicated by an arrow Y, and led into the hollow at the joint between the pipe 13h and hollow, and returned into the vacuum vessel (enclosure) 9 or the housing 3.

As explained before, a lubricant (dynamic pressure bearing fluid) is filled between the thrust ring 13g and fixed shaft 13a of the rotary unit 13, between the fixed shaft 13a and rotary body 13b (in the concentric direction), and between the end portion of the neck of the rotary body 13b and the top of the fixed shaft 13a (in the axial direction). The spiral grooves 13d and 13e provided in the fixed shaft 13a of a herringbone pattern, and function as a radial dynamic plain bearing by cooperating with the lubricant. The lubricant used between the end portion of the neck of the rotary body 13b and the top of the fixed shaft 13a (in the axial direction) and between the fixed shaft 13a and thrust ring 13g functions as a thrust dynamic bearing.

Hereinafter, a brief explanation will be given on an example of the operation of the X-ray apparatus incorporated with the rotating anode X-ray tube shown in FIG. 1 to FIG. 4.

When a current is supplied to the stator coil 19 and a rotating magnetic field is generated, a rotating force is generated in the rotor structure 15a of the cylindrical rotor 15 and the cylindrical rotor 15 or anode target 11 is rotated. When the electron gun 17 emits an electron beam to the anode target 11 in this state, the anode target 11 radiates X-rays.

In this time, the lubricant filled between the anode target 11 and the bearing to support the rotary unit 13, or between the fixed shaft 13a and rotary body 13b, functions as a dynamic pressure fluid bearing. Namely, the heat generated from the dynamic fluid bearing (bearing unit) is cooled by the non-oil/fat (water-based) cooling medium circulated in the pipe 13h and hollow within the fixed shaft 13a of the rotary unit 13, by the feeding pressure from a not-shown pump.

As a cooling medium, propylene glycol, mixture of water and propylene glycol (ratio 1:1), ethylene glycol, or mixture of water and ethylene glycol can be used. Assuming the heat conductivity of an insulating oil to be 1, the heat conductivity of water is 4.5, the heat conductivity of 50% propylene glycol is 2.8, and the heat conductivity of propylene glycol is 1.6. The heat transfer coefficient is increased proportional to the heat conductivity.

FIG. 5 to FIG. 8 explains other examples of cooling the X-ray apparatus incorporated with the rotating anode X-ray tube explained in FIG. 1 to FIG. 4 by circulating a cooling medium. In FIG. 5 to FIG. 8, an X-ray tube with a different structure from the rotating anode X-ray tube shown in FIG. 1 to FIG. 4 will be explained. In all examples, the conception of the invention is common. Therefore, components substantially the same as or similar to those shown in FIG. 1 to FIG. 4 are given the same reference numerals and detailed explanation is omitted. In FIG. 5 to FIG. 8, a method of supplying and circulating (order) a cooling medium will be mainly explained.

In the X-ray apparatus shown in FIG. 5 to FIG. 8, a cooling unit 21 is connected to one end of the fixed shaft 13a holding the anode target 11. The other end of the fixed shaft 13a is fixed to a predetermined position of the vacuum vessel (enclosure) 9.

At the end of the fixed shaft 13a not connected with the pipe from the cooling unit 21, a foot part 13i of the rotary body 13b is provided concentrically (with the fixed shaft 13a) in the outside of the fixed shaft 13a. The outside of the foot part 13i is fixed with a copper or copper alloy cylinder functioning as the rotor structure 15a. The stator coil 19 is arranged concentrically with the rotor structure 15a of the rotary unit 13, just like surrounding the periphery of the unit.

In the vicinity of the cathode 17 opposite to the anode target 11, the recoil electron capture trap (shield structure) 23 which captures the electron recoiled by the anode target 11 out of the electron (thermo electron) radiated from the cathode 17 to the anode target 11, is provided. The electron capture trap 23 is made of copper or copper alloy with a high heat conductivity, and formed to permit circulation of a cooling medium which is circulated in the fixed shaft 13a of the rotary unit 13. A non-oil/fat cooling medium explained before is circulated in a flow path provided at least in the rotary unit 13 and electron capture trap 23.

Figure 5:
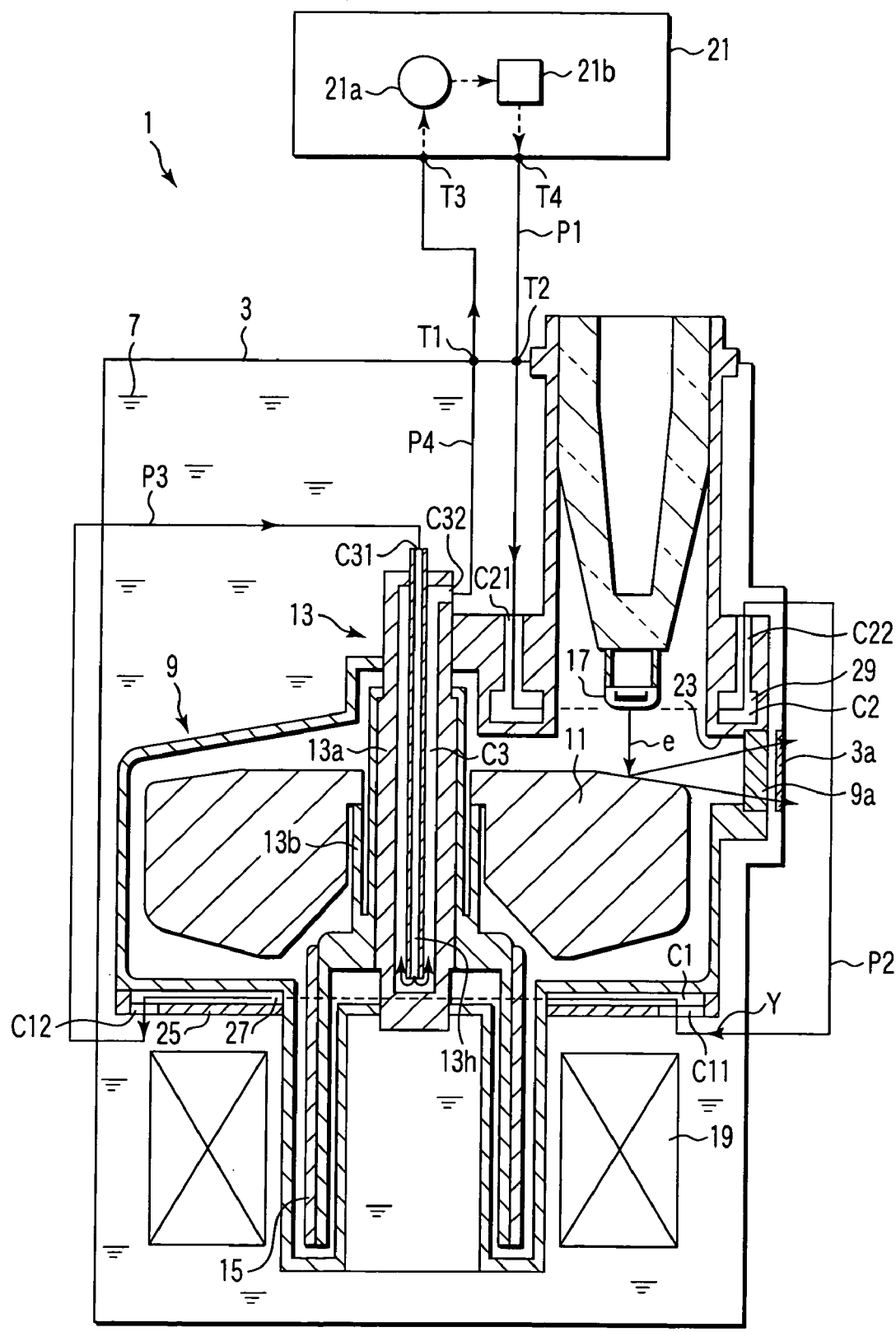
FIG. 5 is a schematic diagram explaining an example of a cooling system (using also an oil/fat-based cooling medium) applicable to the X-ray apparatus explained in FIG. 1 to FIG. 4.

The cooling unit 21 includes a circulation pump 21a to supply a predetermined pressure to the cooling medium, and a heat exchanger (radiator) 21b. The radiator 21b is made of copper or copper alloy with a high heat conductivity. The circulation pump 21a is provided at an optional position in the flow path to circulate the cooling medium. The radiator 21b is provided in the downstream side of the circulation pump 21a, and preferably supplies the cooling medium around the anode target 11 or the fixed shaft 13a of the cylindrical rotor 15 immediately after decreasing the temperature of the cooling medium circulated in the flow path (after cooling the cooling medium). The pump 21a is preferably a gear pump with a high discharge pressure (cooling medium feeding pressure). The cooling structure shown in FIG. 5 is an example of supplying a non-oil/fat cooling medium to the vicinity of at least the rotary unit 13 and recoil electron capture trap 23.

The cooling medium flow path is provided close to at least a part of the X-ray tube main body 5, and is composed of a first cooling path C1, a second cooling path C2 and a third cooling path, for example. The first cooling path C1 is formed cylindrically along the periphery of the vacuum vessel 9. The second cooling path C2 is placed around the cathode 17, or in the vicinity of the recoil electron capture trap 23 and anode target 11. The third cooling path C3 is formed to pass through the hollow 17 in the cylindrical rotor 15.

Specifically, the first cooling path C1 is formed outside the vacuum vessel 9, in the vicinity of the stator coil 19, in the shape surrounding the enclosure 9 by a wall 25 formed just like crossing a not-shown rotary shaft of the rotary unit 13. Namely, the first cooling path C1 is defined as a circular space 27 defined by the wall 25.

The circular space 27 has an inlet port C11 to lead the water-based cooling medium to the first cooling path C1, and an outlet port 12 to exhaust the water-based cooling medium from the first cooling path C1. Namely, the inlet port C11 and outlet port C12 are formed at both ends (with an interval of 180°) holding the central part therebetween.

The second cooling path C2 is a circular space 29 around the cathode 17, or defined at a predetermined position of the recoil electron capture trap 23. The circular space 29 has an inlet port C21 to lead the water-based cooling medium to the second cooling path C2, and an outlet port 22 to exhaust the water-based cooling medium from the second cooling path C2.

The third cooling path C3 is defined by a pipe 13h of the fixed shaft 13a of the rotary unit 13, and a cylinder or hollow around the pipe. The third cooling path is connected from the pipe 13h to the inside of the fixed shaft 13a, changed its route into the hollow at one end of the fixed shaft 13a, and returned to the cooling unit 21.

Pipes P1, P2, P3 and P4 respectively connect the space between the cooling unit 21 and inlet port C21 (second cooling path C2), the space between the outlet port C22 (second cooling path C2) and inlet port C11 (first cooling path C1), the space between the outlet port C12 (first cooling path C1) and inlet port C31 (third cooling path C3), and the space between the outlet port C32 (third cooling path C3) and cooling unit 21, forming flow paths including the first, second and third cooling paths C1, C2 and C3. The pipes P2 and P3 are partially exposed to the outside of the housing, but can be provided within the housing. The position (of the pipes) is not limited to the example shown in the drawing.

The cooling unit 21 is connected to the housing through a removable pipe joint, though not explained in detail. Namely, the flow path between the housing 3 and cooling unit 21 is composed of a hose, for example.

Joints T1 and T2 between the hose and housing 3 and joints T3 and T4 between the hose and cooling unit 27 are removable at least in the side of the housing 3 or cooling unit 21. With this structure, the housing 3 and cooling unit 21 can be easily separated, facilitating installation and maintenance of the cooling unit 21.

In the X-ray apparatus describe above, the rotary unit 13 is rotated by the induction electromagnetic field generated by the stator coil 19. The anode target 11 is rotated by the rotation of the rotary unit 13. When the cathode 17 radiates an electron beam e to the anode target 11, in this state, the anode target 11 emits X-rays. The X-rays is output through the X-ray output window 9a (vacuum vessel) and 3a (housing).

In the operating state of the X-ray apparatus having the rotating anode X-ray tube main body 5, or the X-ray tube main body 5, the temperature of the anode target 11 is increased by the impingement of the electron beam e from the cathode 17. The temperature of the circumference, particularly the recoil electron capture trap 23 is also increased. Namely, the temperature of the vacuum vessel (enclosure) 9 is increased by the conduction of the heat.

The heat of the vacuum vessel 9 and stator 19 increases the temperature of the cooling liquid (cooling medium) in the housing 3. The heated cooling medium is circulated by the pump 21a, and guided to the cooling unit 21. The heat caused by the increased temperatures of the vacuum vessel 9 and cooling unit 21 is transmitted to the cooling unit 21 through the cooling medium, and radiated to the outside by the heat exchanger (radiator) 21b of the cooling unit 21.

The cooling medium sent from the heat exchanger 21b of the cooling unit 21 is led to the inlet port C21 through the pipe P1, and cools the parts in the vicinity of the electron gun (cathode) 17, recoil electron capture trap 23 and anode target 11, while passing through the circular space 29 (second cooling path C2).

Therefore, the cooling liquid passing through the outlet port C22 is led to the inlet port C11 through the pipe P2, and cools the part around the vacuum vessel 9 when passing through the circular space 27 (first cooling path C1).

The cooling liquid exhausted from the outlet port 12 is circulated from the inlet port C31 to the pipe 13h (third cooling path C3) of the fixed shaft 13a and the outside hollow through the pipe P3, and returned to the cooling unit 21 from the outlet port C32 through the pipe P4.

As explained above, the heat generated in the X-ray tube main body 5 and in the vicinity of the stator 19 is efficiently guided to the cooling unit 21 by the cooling medium with a high heat conductivity flowing in the first, second and third cooling paths C1, C2 and C3, and radiated to the outside when the cooling medium is cooled by the cooling unit 21.

On the other hand, the insulating oil filled in the housing 3 is moved contacting the outside surface of the wall 25, and efficient heat transfer with the cooling liquid is possible, and the heat radiation by the insulating oil is increased. As a result, a heat exchanger for the insulating oil is unnecessary, and the apparatus configuration becomes simple.

The insulating oil flows in the circumference of the stator 19 and X-ray output window 3a without contacting a water-based cooling medium, and the decrease of electrical insulation and corrosion of the output window can be prevented.

Namely, as the heat generated around the X-ray tube main body 5 and stator 19 is efficiently radiated to the outside, the X-ray apparatus 1 can stably output X-rays for a long period and ensure high reliability.

Further, by the water-based (non-oil/fat) cooling medium flowing in the pipe 13h provided in the fixed shaft 13a of the cylindrical rotor 15 and the hollow defined in the circumference, the area in the vicinity of the dynamic pressure fluid bearing that is considered to have a relatively large load can be efficiently cooled.

Therefore, the possibility of stopping (burning) the dynamic pressure fluid bearing (undesirably by the heat) is decreased.

Figure 6:
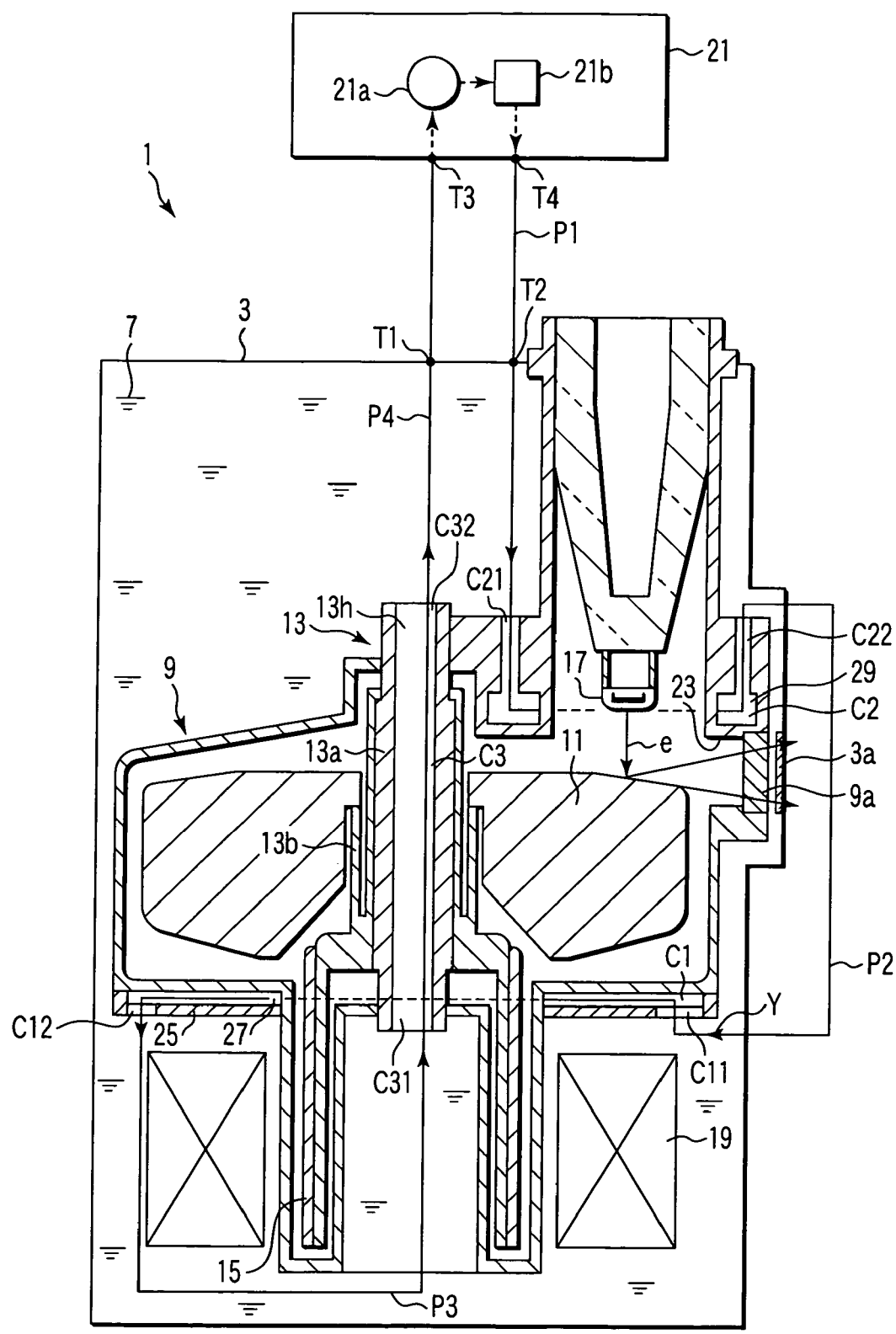
FIG. 6 is a schematic diagram explaining a modification of the cooling system of the X-ray apparatus shown in FIG. 5.

FIG. 6 shows a modification of the X-ray apparatus explained in FIG. 5, and an example in which the third cooling path C3 is formed as a linear tube.

In the example shown in FIG. 6, the fixed shaft 13a of the cylindrical rotor 15 is simple hollow (cylindrical) and opened at both ends. Therefore, the inlet port C31 for leading a water-based cooling medium to the third cooling path C3 and the outlet port C32 for exhausting the water-based cooling medium from the third cooling path C3 are placed at the ends of the fixed shaft 13a opposite to each other. In the X-ray apparatus 1 shown in FIG. 6, the pipes P1, P2, P3 and P4 respectively connect the space between the cooling unit 21 and inlet port C21 (second cooling path C2), the space between the outlet port C22 (second cooling path C2) and inlet port C11 (first cooling path C1), the space between the outlet port C12 (first cooling path C1) and inlet port C31 (third cooling path C3), and the space between the outlet port C32 (third cooling path C3) and cooling unit 21, forming flow paths including the first, second and third cooling paths C1, C2 and C3. The pipe P2 is partially exposed to the outside of the housing, but can be provided within the housing. The position (of the pipes) is not limited to the example shown in the drawing.

In the X-ray apparatus shown in FIG. 6, the cooling liquid exhausted from the outlet port C12 is led to the inlet port C31 through the pipe P3, passed through the fixed shaft 13a (third cooling path C3) of the cylindrical rotor 15, and returned from the outlet port C32 to the cooling unit 21 through the pipe P4.

With this structure, the flow rate of the cooling medium passing in the fixed shaft 13a of the cylindrical rotor 15 is stabilized, and the heat generated around the X-ray tube main body 5 and stator 19 can be efficiently radiated to the outside. The X-ray apparatus can stably output X-rays for a long period, and ensure high reliability. Further, as the load to the pump 21a is decreased, and an undesired fluctuation of the flow rate of circulating a cooling medium can be prevented. Therefore, the cooling efficiency is increased, and the possibility of damaging (burning) the dynamic pressure fluid bearing considered to have a relatively large load is decreased.

Figure 7:
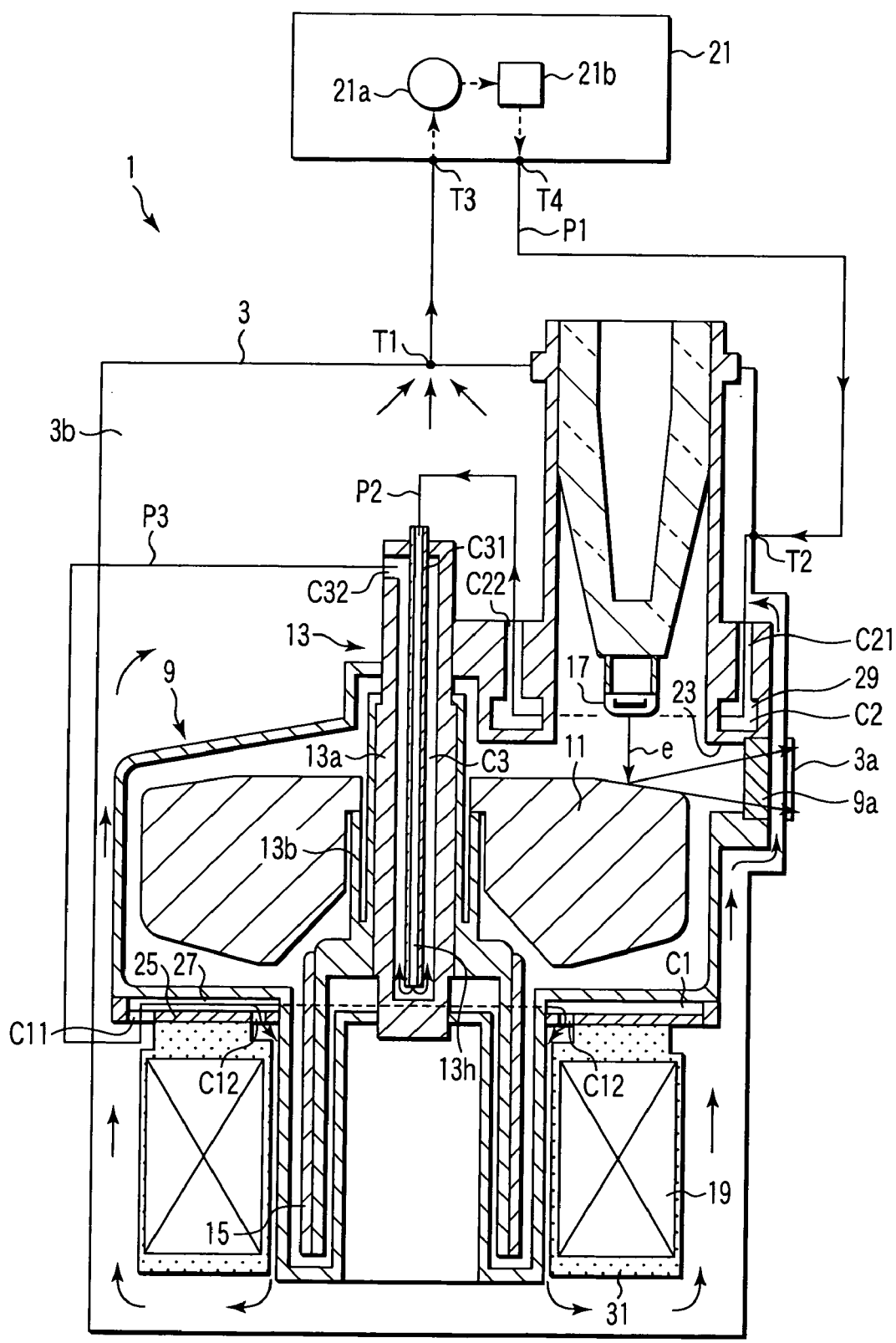
FIG. 7 is a schematic diagram explaining an example of a cooling system (using only a non-oil cooling medium) applicable to the X-ray apparatus explained in FIG. 1 to FIG. 4.

In the example shown in FIG. 7, the cooling system shown in FIG. 3 is composed of only a non-oil/fat cooling medium or water-based cooling medium circulating in the housing 3.

In FIG. 7, in the third cooling path C3, a cooling medium circulated in the pipe 13h formed in the fixed shaft 13a of the cylindrical rotor 15 and the surrounding hollow is led to the inlet port C31, passed through the outlet port C32, and guided to the first cooling path C1. The cooling medium guided to the first cooling path C1 is exhausted from the outlet port C12 to the internal space 3b of the housing 3.

Namely, a cooling medium flow path is formed between the cooling unit 21 and the internal space 3b of the housing 3. Therefore, the internal space 3b containing the X-ray tube main body 5 is filled with a water-based cooling medium.

The stator 19 is immersed in the cooling medium together with the X-ray tube main body 5 in the housing 3, and preferably molded by a resin material 31 having high electrical insulation, waterproof and heat conductivity.

As a resin material usable for the molding resin material 31, there are epoxy resin, tar epoxy resin, polyimide resin, acrylic resin, fluoric resin, silicone resin and polyurethane resin. Mixed resin including one of these resins as a main component is also usable.

This prevents deterioration of electrical insulation around the stator 19 without contacting the water-based cooling medium.

In the X-ray apparatus shown in FIG. 7, only one kind of water-based cooling medium can be used as a cooling medium. This can decrease the cost and facilitate maintenance. A water-based cooling medium has a high heat transfer rate compared with insulating oil, and can efficiently radiate the heat of the whole apparatus.

Further, a water-based cooling medium has a small viscosity coefficient compared with insulating oil (non-oil/fat cooling medium). This decreases the load of the pump 21a.

Therefore, the flow rate of circulating a cooling medium is stabilized. Besides, the cooling capacity of a cooling medium is increased by the cooling mechanism. This decreases the possibility of damaging (burning) the dynamic pressure fluid bearing that is considered to have a relatively large load.

Figure 8:
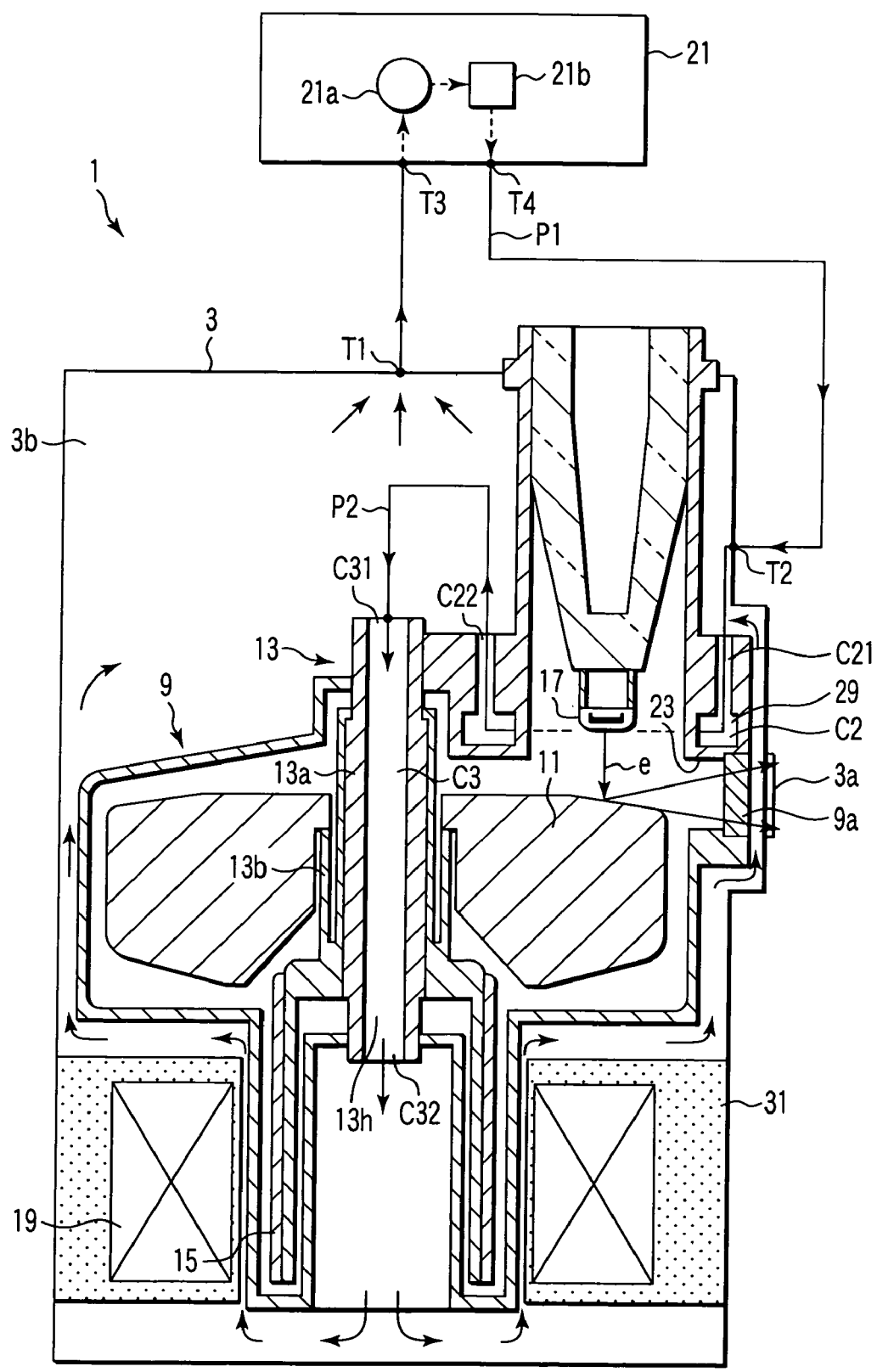
FIG. 8 is a schematic diagram explaining a modification of the cooling system of the X-ray apparatus shown in FIG. 7.

FIG. 8 shows a modification of the X-ray apparatus explained in FIG. 7, in which the third cooling path C3 is formed as a straight tube (the fixed shaft 13a of the cylindrical rotor 15 is formed as a simple cylinder, and a flow path is formed linearly). Therefore, the inlet port C31 for leading a water-based cooling medium to the third cooling path C3 and the outlet port C32 for exhausting the water-based cooling medium from the third cooling path C3 are placed at the ends of the fixed shaft 13a opposite to each other.

Similar to FIG. 7, a cooling medium flow path is formed between the cooling unit 21 and the internal space 3b of the housing 3. Therefore, the internal space 3b containing the X-ray tube main body 5 is filled with a water-based cooling medium. As the stator 19 is immersed in the cooling medium together with the X-ray tube main body 5 in the housing 3, and preferably molded by a resin material 31 having high electrical insulation, waterproof and heat conductivity.

In the X-ray apparatus shown in FIG. 8, only one kind of water-based cooling medium can be used as a cooling medium. This can decrease the cost and facilitate maintenance. A water-based cooling medium has a high heat transfer rate compared with insulating oil, and can efficiently radiate the heat of the whole apparatus.

Further, a water-based cooling medium has a small viscosity coefficient compared with insulating oil. This decreases the load of the pump 21a. Therefore, the flow rate of circulating a cooling medium is stabilized. The cooling capacity of the cooling mechanism is increased, and the possibility of burning the dynamic pressure fluid bearing is decreased.

Figure 9:
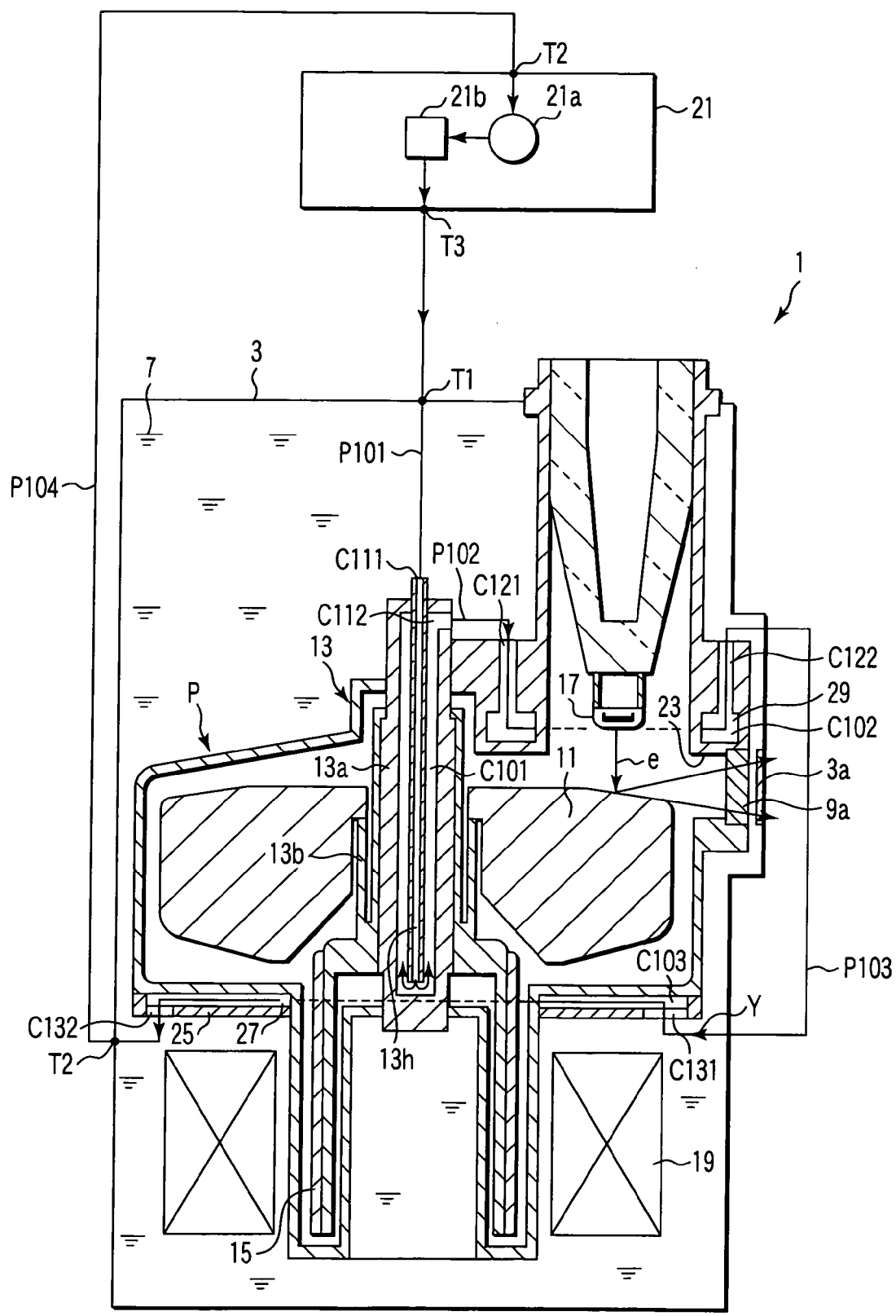
FIG. 9 is a schematic diagram explaining a route to circulate a non-oil/fat cooling medium in the X-ray apparatus shown in FIG. 5.
Figure 10:
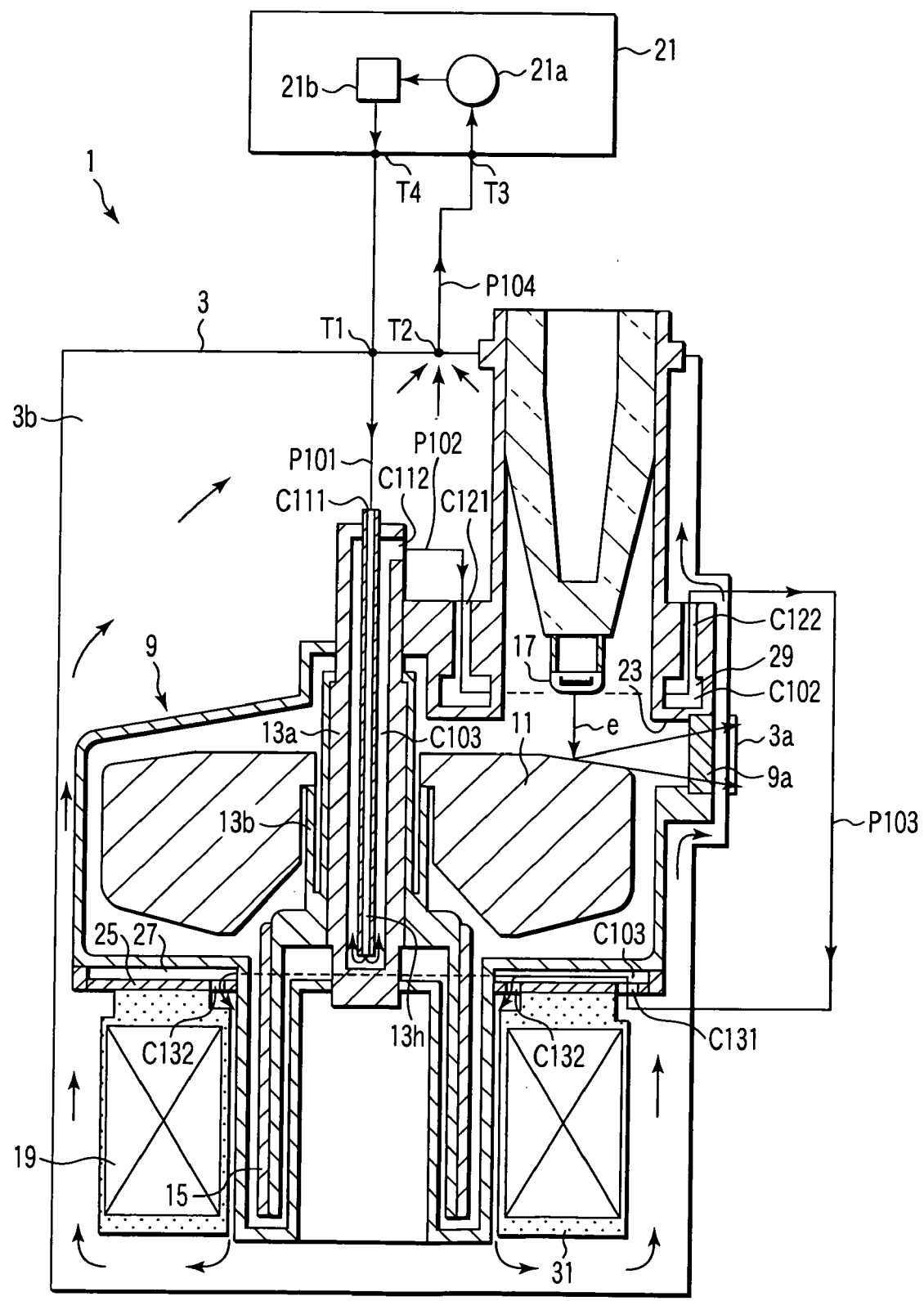
FIG. 10 is a schematic diagram explaining an example of changing a route to circulate a non-oil/fat cooling medium in the X-ray apparatus shown in FIG. 7.

FIG. 9 and FIG. 10 explain an example of changing a route of circulating a cooling medium in the X-ray apparatus explained in FIG. 5 and FIG. 7. In the X-ray apparatus shown in FIG. 9 and FIG. 10, only the route of circulating a cooling medium is different from the X-ray apparatus shown in FIG. 5 and FIG. 7, similar or substantially the same components as those already explained are given the same reference numerals, and detailed explanation will be omitted.

In the X-ray apparatus shown in FIG. 9, the flow path to be supplied with the cooling medium is connected from a radiator 21b of the cooling unit 21 directly to the pipe 13h of the fixed shaft 13a of the rotor 15 through the pipe P101 (an inlet port C111, a first cooling path C101).

The cooling medium guided to the pipe 13h is guided to a pipe P102 from the periphery of the inlet port C111 and outlet port C112 provided nearby, through a hollow in the fixed shaft 13a, or a space formed between the pipe 13h and shaft 13a provided in the cylindrical fixed shaft 13a. The cooling medium is further guided to the second cooling path C102 provided around the cathode 17 or in the vicinity of the recoil electron capture trap 23 and anode target 11. Namely, the cooling medium circulating in the fixed shaft 13a is guided from the inlet port C121 to the vicinity of the recoil electron capture trap 23, and exhausted to the outlet port C122.

The cooling medium circulating in the recoil electron capture trap 23 is guided through the pipe P103 to an inlet port C131 of the third cooling path C103 defined as the circular space 27, which is formed by a wall 25 formed outside the vacuum enclosure 9 and close to the stator coil 19, in the shape surrounding the enclosure 9 just like crossing a not-shown rotary shaft of the rotary unit 13.

The circular space 27 is connected to the outlet port C132 formed at a position of 180° from the inlet port C131 holding the central part therebetween. The pipe P104 is connected to the pump 21a of the cooling unit 21. Namely the cooling medium guided outside the vacuum vessel 9 is guided to the heat exchanger 21b of the cooling unit 21 through the pipe P104.

In other words, in the cooling mechanism shown in FIG. 9, the pipes P101, P102, P103 and P104 respectively connect the space between the radiator 21b of the cooling unit 21 and inlet port C111 (first cooling path C101), the space between the outlet port C112 (first cooling path C101) and inlet port C121 (second cooling path C102), the space between the outlet port C122 (second cooling path C102) and inlet port C131 (third cooling path C103), and the space between the outlet port 132 (third cooling path C103) and cooling unit 21. Therefore, a closed cooling medium flow path is formed. The pipes P102 and P103 are partially exposed to the outside of the housing, but can be provided within the housing. The position (of the pipes) is not limited to the example shown in the drawing. Of course, any pipe or inlet and outlet ports are connected by a hose, and at least one end is removable.

According to the cooling paths shown in FIG. 9, the cooling medium fed from the heat exchanger 21b first cools the rotary body 13b and fixed shaft 13a, which serve as a bearing unit of the rotary unit 13 generating a high heating value. This certainly prevents burning of the dynamic pressure fluid bearing.

FIG. 10 shows an example in which the cooling system shown in FIG. 9 is composed of only a non-oil/fat cooling medium or water-based cooling medium circulated in the housing 3.

As shown in FIG. 10, the pip P101 directly connects the radiator 21b of the cooling unit 21 to the pipe 13h of the fixed shaft 13a of the rotor 15 (inlet port C111, first cooling path C101)

The cooling medium guided to the pipe 13h is guided to a pipe P102 from the periphery of the inlet port C111 and outlet port C112 provided nearby, through a hollow in the fixed shaft 13, or a space formed between the pipe 13h and shaft 13a provided in the cylindrical fixed shaft 13a. The cooling medium is further guided to the second cooling path C102 provided around the cathode 17 or in the vicinity of the recoil electron capture trap 23 and anode target 11. Namely, the cooling medium circulating in the fixed shaft 13a is guided from the inlet port C121 to the vicinity of the recoil electron capture trap 23, and exhausted to the outlet port C122.

The cooling medium circulating in the recoil electron capture trap 23 is guided through the pipe P103 to an inlet port C131 of the third cooling path C103 defined as the circular space 27, which is formed by a wall 25 formed outside the vacuum enclosure 9 and close to the stator coil 19, in the shape surrounding the enclosure 9 just like crossing a not-shown rotary shaft of the rotary unit 13.

The circular space 27 has an outlet port 132 close to the central part, and the cooling medium cooling the circular space 27 is exhausted to the internal space 3b of the housing 3. The cooling medium exhausted to the internal space 3b of the housing is returned from the joint T2 to the pump 21a of the cooling unit 21 through the pipe P104. Namely, the cooling medium guided outside the vacuum vessel 9 is guided to the heat exchanger 21b of the cooling unit 21. The configuration of the other parts except the flow path is similar to that of FIG. 7 compared in FIG. 5, and detailed explanation will be omitted.

In the cooling structure shown in FIG. 10, a cooling medium flow path is formed between the cooling unit 21 and the internal space 3b of the housing 3. Therefore, the internal space 3b containing the X-ray tube main body 5 is filled with a water-based cooling medium. As explained in FIG. 7, the stator 19 is immersed in the cooling medium together with the X-ray tube main body 5 in the housing 3, and preferably molded by a resin material 31 having high electrical insulation, waterproof and heat conductivity.

The present invention is not restricted to the above-mentioned embodiments as they are and their constituent elements can be variously modified/embodied without departing from the essence of the present invention. Various embodiments of the present invention can be achieved by properly combining a plurality of constituent elements disclosed in the embodiments. For example, some constituent elements may be eliminated from all the constituent elements of the embodiments of the present invention.

When using a conventional ball bearing, the heat of the anode target is transmitted to the bearing and the temperature of the bearing may be increased. In this case, the present invention can be applied as a structure for cooling the interior of the bearing by a cooling liquid.

As explained hereinbefore, according to the present invention, a non-oil/fat cooling liquid with a high heat conductivity is used as a cooling medium, and the cooling efficiency of the X-ray apparatus which uses a rotating anode X-ray tube using a dynamic pressure plain bearing can be increased. Further, as the load of a pump for circulating a cooling liquid (cooling medium) is decreased, the flow rate of circulating the cooling medium is stabilized. Therefore, the cooling efficiency is increased, and stable characteristic or stable X-rays can be obtained for a long period, even if a dynamic fluid bearing with a relatively large load is used.

Therefore, the lives of an X-ray image diagnostic apparatus and a non-destructive inspection apparatus incorporating with the X-ray apparatus are increased. Further, as the lives of the X-ray apparatus and internal X-ray source (X-ray tube) itself are increased, the running costs of an X-ray image diagnostic apparatus and a non-destructive inspection apparatus are also decreased.

According to the present invention, a non-oil/fat cooling liquid with a heat conductivity higher than insulating oil (oil/fat-based cooling medium) is used as a cooling medium, and the cooling efficiency of a rotating anode X-ray tube using a dynamic pressure plain bearing (liquid metal lubricant dynamic pressure bearing) and an X-ray apparatus using the X-ray tube as an X-ray source can be increased.

Therefore, the X-ray apparatus can stably output X-rays for a long period.

Therefore, the lives of an X-ray image diagnostic apparatus and a non-destructive inspection apparatus incorporating with the X-ray apparatus are increased. Further, as the lives of the X-ray apparatus and internal X-ray source (X-ray tube) itself are increased, the running costs of an X-ray image diagnostic apparatus and a non-destructive inspection apparatus are also decreased.

What is claimed is:

1. An X-ray apparatus comprising:
    an anode target which generates X-rays;
    an electron radiation source which generates an electron to the anode target;
    an electron capture trap which captures the electron recoiled by the anode target;
    a rotor which includes a shaft and holds the anode target;
    a stator which generates a driving force to rotate the rotor;
    a bearing which rotatably supports the rotor;
    an enclosure which keeps at least the anode target, electron radiation source and rotor at a predetermined vacuum;
    a housing which is configured to contain a cooling medium around the enclosure;
    a cooling medium pipe which guides a cooling medium at least inside the shaft of the rotor, in the vicinity of the electron capture trap, and in the vicinity of the anode target in that order;
    a pump which circulates a cooling medium in the cooling medium pipe; and
    a heat exchanger which radiates the heat transmitted by a cooling medium circulated by the pump.

2. The X-ray apparatus according to claim 1, wherein the bearing is a dynamic pressure plain bearing using a liquid metal as a lubricant.

3. The X-ray apparatus according to claim 2, wherein the pump is a gear pump.

4. The X-ray apparatus according to claim 3, wherein the space between the enclosure and housing provides a part of a flow path for the cooling medium.

5. The X-ray apparatus according to claim 4, wherein the cooling medium includes water as a main component.

6. The X-ray apparatus according to claim 4, wherein the cooling medium includes glycol.

7. The X-ray apparatus according to claim 4, wherein the cooling medium includes a mixture of glycol including water as a main component.

8. An X-ray apparatus comprising:
    a rotatable anode X-ray tube which contains a rotatable anode target including a shaft, a cathode opposite to the anode target, and an electron capture trap which captures the electron recoiled by the rotatable anode target, in a vacuum enclosure;
    a stator which generates an induction electromagnetic field to rotate the anode target;
    a dynamic pressure plain bearing which rotatably supports the shaft of the anode target, and uses a liquid metal as a lubricant;
    a housing which contains and holds at least the rotatable anode X-ray tube;
    a flow path which is provided close to at least a part of the rotating anode X-ray tube inside the housing, and circulates a water-based cooling medium at least inside the shaft of the rotatable anode target, in the vicinity of the electron capture trap, and in the vicinity of the rotatable anode target in that order;
    a gear pump which is provided at a predetermined position in the flow path, and circulates the water-based cooling medium; and
    a cooling unit which has a radiator to radiate the heat of the water-based cooling medium.

9. The X-ray apparatus according to claim 8, wherein the space between the enclosure and housing provides a part of the flow path for the cooling medium.

10. An X-ray apparatus comprising:
    a rotatable anode X-ray tube which contains a rotatable anode target including a shaft, and a cathode opposite to the anode target, in a vacuum enclosure;
    an electron capture trap which captures the electron recoiled by the rotatable anode target;

a stator which generates an induction electromagnetic field to rotate the anode target;

a dynamic pressure plain bearing which rotatably supports the shaft of the anode target, and uses a liquid metal as a lubricant;

a housing which contains and holds at least the rotatable anode X-ray tube;

a flow path which is provided close to at least a part of the rotating anode X-ray tube, and configured to circulate a cooling medium at least inside the shaft of the rotatable anode target, in the vicinity of the electron capture trap, and in the vicinity of the rotatable anode target in that order;

a gear pump which is provided at a predetermined position in the flow path, and circulates the cooling medium; and a cooling unit which has a radiator to radiate the heat of the cooling medium.

11. The X-ray apparatus according to claim 10, wherein the cooling medium is a water-based cooling medium.

* * * * *

UNITED STATES PATENT AND TRADEMARK OFFICE
CERTIFICATE OF CORRECTION

PATENT NO.       : 7,197,118 B2                                          Page 1 of 1
APPLICATION NO.  : 11/404778
DATED            : March 27, 2007
INVENTOR(S)      : Anno et al.

It is certified that error appears in the above-identified patent and that said Letters Patent is hereby corrected as shown below:

TITLE PAGE, ITEM
(73) Assignee

"Toshiba Electron Tubes & Devices, Tokyo (JP)" should read --Toshiba Electron Tubes & Devices Co., Ltd., Tokyo (JP)--

Signed and Sealed this

Second Day of October, 2007

JON W. DUDAS
*Director of the United States Patent and Trademark Office*